Nov. 27, 1956     G. A. ARGABRITE     2,771,775
SURFACE THERMOMETER WITH MAGNETIC RETAINING MEANS
Filed May 28, 1954
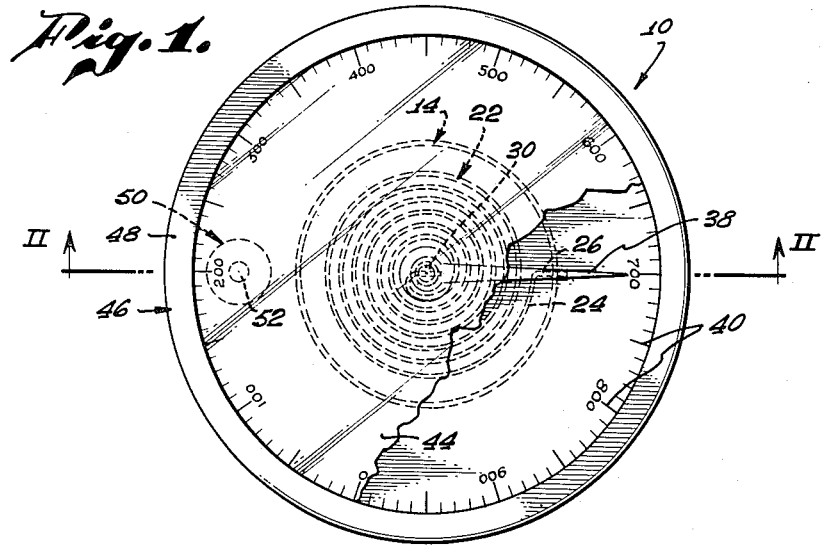
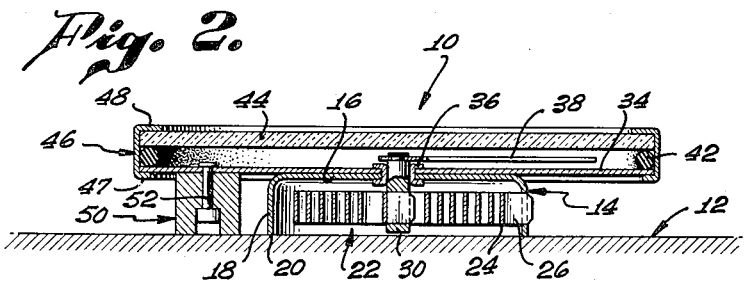
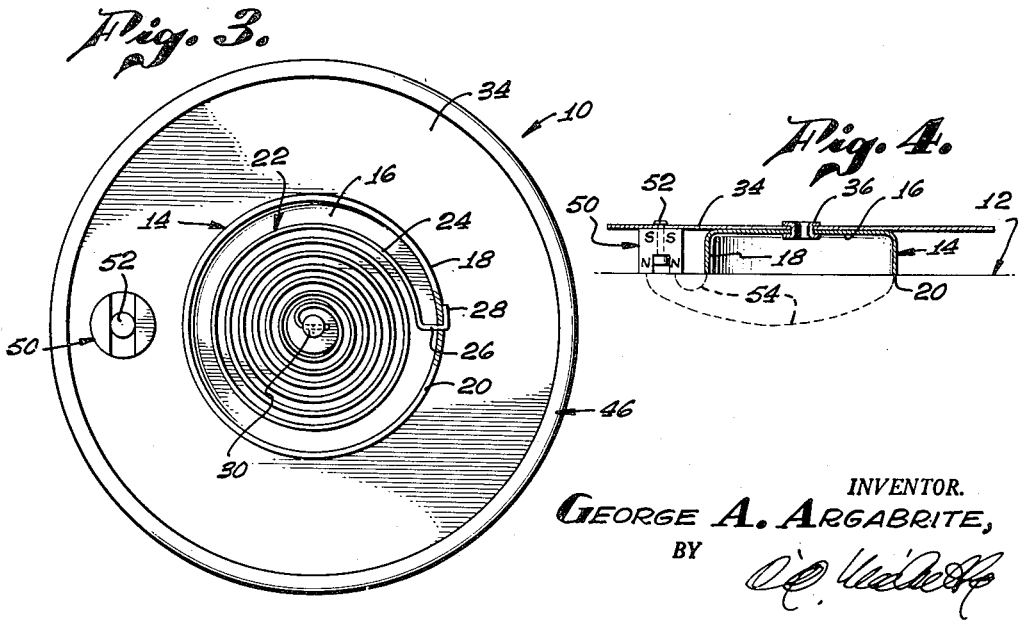
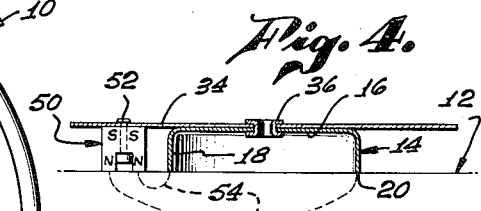
INVENTOR.
GEORGE A. ARGABRITE,
BY
ATTORNEY.

United States Patent Office 2,771,775
Patented Nov. 27, 1956

2,771,775

SURFACE THERMOMETER WITH MAGNETIC RETAINING MEANS

George A. Argabrite, North Hollywood, Calif., assignor to Pacific Transducer Corp., Los Angeles, Calif., a corporation of California Application May 28, 1954, Serial No. 432,983

2 Claims. (Cl. 73—343)

This invention relates generally to a surface thermometer and particularly to such a device including means for magnetic retention upon a paramagnetic surface. The present application is an improvement in certain respects over the structure shown in my copending application, Serial No. 305,810, filed August 22, 1952, now United States Patent No. 2,701,964.

Generally speaking the present thermometer includes an apertured supporting base member housing a thermoresponsive element and an apertured circular dial above the base member and fixed thereto bearing scalar indicia thereon. A short shaft is rotatably journalled in the apertures and is attached to the thermoresponsive element at its lower end and carries an indicating pointer at its upper end, the pointer being moved relative to the scalar indicia to indicate the temperature of the thermoresponsive element. Upon the lower surface of the dial is mounted a source of magnetomotive force in the form of a permanent magnet. The magnetic circuit for the flux created by the magnet includes the dial and the base member, both of which are made of paramagnetic material, and the entire device is thus retained on a paramagnetic surface. Although the preferred embodiment of the invention provides an arrangement of parts adapted for magnetic attachment to a substantially flat surface, it will be understood that the device need not necessarily be so constructed.

It is a principal object of the present invention to provide a surface thermometer including means for magnetic retention to a paramagnetic sample wherein the magnetic circuit includes a portion of the thermometer housing.

Another object is to provide in a surface thermometer a housing or heat shield for the thermosensitive element of the device which serves also as a portion of a magnetic-retaining circuit.

Another object of the invention is to disclose a surface thermometer including a permanent magnet so arranged as to make the entire structure very compact.

A further object of the invention is to disclose a surface thermometer having the above advantages which is usable also as a conventional thermometer.

These and other allied objects of the invention will be understood from a study of the following description of a preferred embodiment thereof taken in connection with the accompanying drawing in which:

Fig. 1 is a top plan view of a thermometer embodying the present invention with a portion of the transparent cover broken away.

Fig. 2 is a sectional view taken on line II—II of Fig. 1 showing the thermometer mounted upon a planar-supporting surface.

Fig. 3 is a bottom plan view of the device of Figs. 1 and 2.

Fig. 4 is a simplified diagrammatic representation of the framework of the present thermometer including the permanent magnet carried thereby and showing the magnetic circuit existing when the thermometer is mounted upon a paramagnetic object.

Referring now in detail to the drawing and particularly to Figs. 1 and 2 thereof, a thermometer indicated generally at 10 is shown resting upon a horizontal planar surface 12 of an object which is assumed to be made of paramagnetic material. A housing indicated generally at 14 and made of paramagnetic material is formed in the shape of a somewhat shallow inverted cup having a flat top 16 and a preferably integrally formed cylindrical side wall 18 terminating in a circular lower edge 20 defining the open bottom of the housing. A temperature responsive member indicated generally at 22 is disposed within the housing 14 and in the exemplary form herein shown the temperature responsive member 22 constitutes a spirally formed bimetallic strip whose outer coil or lay 24 is provided with an outwardly extending tongue 26 received in a vertical slot of the side wall 18 and fixed in suitable manner to the side wall of the housing 14 (see Fig. 3). For example, the tongue 26 may be provided with a bent-over portion 28 fastened to the outer surface of the side wall by suitable means such as spot welding or the like.

In the center of the spiral coil 22 there is a vertically disposed pin 30 fixed to and carried by the inner end of the coil 22. The pin 30 extends upwardly through a central aperture in the top 16 of the housing 14 and also through a central aperture formed in a circular flat plate 34 made of paramagnetic material and immediately overlying the flat top 16 in low-reluctance contact therewith. The plate 34 is fixed to the housing 14 with apertures in alignment and held in such position as by the annular sleeve member 36 having upper and lower portions swaged or otherwise deformed to retain the parts in assembled relation as shown. The pin 30 is rotatably journalled in the annular member 36 and an indicating pointer 38 is fixed to the upper end of the pin 30. The plate 34 constitutes the bottom of a thin cylindrical chamber in which the pointer 38 may move arcuately by reason of rotation of pin 30 caused by temperature changes of the bimetallic coil 22. A temperature scale covering a suitable range is embossed, printed or otherwise reproduced upon the upper surface of plate 34, the indicating pointer 38 being adapted to cooperate with the scale 40 to visibly indicate temperature of the bimetallic coil 22 in well-understood manner. A circular spacing member 42 such as a resilient O-ring or the like overlies the periphery of plate 34 and a circular cover glass 44 rests upon the spacer member 42 and constitutes the top of the chamber in which the pointer 38 is disposed. The cover glass 44, spacer member 42 and the plate 34 are held in assembled relation by a conventional retainer member indicated generally at 46 and including lower and upper inturned lips 47 and 48.

Means are provided for magnetically retaining the thermometer thus far described on a paramagnetic surface, and in the presently illustrated preferred embodiment of the invention such means include a permanent magnet indicated generally at 50 attached to the lower surface of the plate 34 by suitable means such as a vertically extending rivet pin 52. Preferably the magnet is spaced well away from the center of the plate, adjacent the periphery thereof, so the entire structure is stable when attached to a supporting surface.

The magnetic circuit created by the magnet 50 of the present invention is schematically shown in Fig. 4. It will be seen that, assuming the permanent magnet 50 has its north pole "N" in contact with the paramagnetic surface 12, magnetic lines of force extend from that north pole through the object 12 as indicated at 54. Such lines of force then continue into the cup-shaped housing 14, extending upwardly through the side wall 18 of the housing and to the flat top 16 thereof. Because of the flat circular plate 34 is held in intimate contact with the top 16, the magnetic lines of force pass into the plate 34 and continue radially outwardly therein to return to the upper end of magnet 50 at its south pole "S." It will be seen that if the paramagnetic surface 12 is planar and the lower rim 20 of housing 14 defines a plane, there is virtually no air gap in the magnetic circuit and the resultant flux serves to retain the entire instrument in position on the surface of the object whose temperature is to be measured. The invention, however, is not limited to use upon a virtually planar surface. It is obvious that the thermometer might be used to measure, for example, the temperature of a cylindrical pipe or the like and in such case the conformation of the lower surface of the magnet 50 and of the lower rim 20 are formed to complement such cylindrical pipe in order to minimize the reluctance of the magnetic circuit. It will be further noted that the temperature responsive member 22 is wholly disposed within the cup-shaped housing 14 so that the temperature within that housing is virtually that of the object 12 substantially unaffected by ambient temperature. Although the housing 14 is herein shown as having a cylindrical side wall 18, the invention contemplates other forms as well, such as polygonal, for the side wall.

Variations and modifications of the exemplary form of the invention herein shown and described, in addition to those just referred to, are within the spirit of the invention and are intended to be embraced within the scope of the following claims.

I claim:
1. A magnetically retained surface thermometer comprising: an apertured inverted cup-shaped paramagnetic housing terminating downwardly in a lower edge adapted to contact a paramagnetic sample; a temperature responsive member within said housing and supported thereby; means above said housing for indicating the temperature of said member including an element movable in the housing aperture and responsive to movement of said member; a horizontally extending paramagnetic plate fixed to the upper surface of the housing and in low reluctance contact therewith; and a permanent magnet fixed to said plate and extending downward therefrom and laterally spaced from the housing.

2. The invention as stated in claim 1 wherein said edge is planar and the lower end of the magnet is in horizontal alignment therewith.

References Cited in the file of this patent
UNITED STATES PATENTS

| 2,060,713 | Wright et al. | Nov. 10, 1936 |
| 2,417,860 | Cline | Mar. 25, 1947 |
| 2,573,205 | Lamb | Oct. 30, 1951 |

FOREIGN PATENTS

| 155,156 | Switzerland | Aug. 16, 1932 |